Jan. 10, 1967   W. O. STAUFFER   3,296,686
METHOD OF MAKING A FINNED HEAT EXCHANGER
Filed April 16, 1964   3 Sheets-Sheet 1

INVENTOR.
WILLIAM O. STAUFFER
BY
Martin D. Wittstein
ATTORNEY

Jan. 10, 1967  W. O. STAUFFER  3,296,686
METHOD OF MAKING A FINNED HEAT EXCHANGER
Filed April 16, 1964  3 Sheets-Sheet 2

INVENTOR.
WILLIAM O. STAUFFER
BY Martin D Wittstein
ATTORNEY

Jan. 10, 1967     W. O. STAUFFER     3,296,686
METHOD OF MAKING A FINNED HEAT EXCHANGER
Filed April 16, 1964     3 Sheets-Sheet 3

INVENTOR.
WILLIAM O. STAUFFER
BY
Martin D. Wittstein
ATTORNEY 3,296,686
METHOD OF MAKING A FINNED HEAT EXCHANGER
William O. Stauffer, Hamden, Conn., assignor to Olin Mathieson Chemical Corporation, a corporation of Virginia
Filed Apr. 16, 1964, Ser. No. 360,230
8 Claims. (Cl. 29—157.3)

This invention relates generally to the manufacture of finned heat exchange devices and other finned metal articles. More particularly, the invention relates to a novel method of forming fins on sheet metal or on a composite metal article in which the fins and composite article are forge welded into a unitary element in a single continuous or non-continuous operation, and in which the fins are formed from stock of unitary construction.

As is well known in the art, finned heat transfer or heat exchange devices, either with or without internal hollow passageways for containment of a heat transfer medium, find a wide variety of applications in the general field of heat exchange, transfer, or conduction. For example, such articles are frequently employed as radiator panels for internal combustion engines in which a finned panel is utilized to increase the heat distribution contact surface to a cooling medium passing thereover, usually air. Similarly, these articles find application as radiant heaters for home use in which a heating core is confined within a hollow internal passageway and heat is distributed by means of integral fin contact surface. Similarly, in the fields of refrigeration and air conditioning condensers and forced air evaporators, a demand exists for a wide variety of finned heat exchange devices combined with internal passageway systems to accommodate flow of a heat transfer medium to facilitate exchange of heat from the one medium to a second external heat dissipating medium.

There have been numerous attempts made to produce a finned heat transfer or heat exchange article which is suitable for the above exemplary uses as well as others. In the search for a suitable way of manufacturing these articles, three major obstacles have been encountered. One of these is the problem of providing a satisfactory way of attaching the fins to the heat transfer panel with sufficient strength and rigidity that the fins will withstand at least the normal handling and wear and tear to which the article may be subjected. Another is the problem of achieving a suitable intimacy of contact between the adjacent surfaces of the fin and panel where these surfaces are coincident in order to achieve maximum efficiency of heat transfer from the panel to the fin. Still another problem is that of the cost involved in the often complicated and numerous steps involved in the more conventional procedures for making finned heat exchangers which usually require the association together of a great many individual components to fabricate the finished article.

These, as well as other problems not herein specifically mentioned, are overcome to a surprising extent by the process of the present invention which produces a finned heat exchange article possessing the advantages of practicality and functionality obtained by similar prior art devices and yet does not suffer the disadvantages and difficulties mentioned above, thereby achieving a degree of efficiency and economy far exceeding many comparable prior art devices. To this end the method of this invention comprises in one of its broader aspects the formation by more or less conventional means of a multiple sheet composite having a patterned layer of weld preventing material sandwiched therebetween, the formation by any of a variety of means more fully described hereinafter of a layer of fin stock material which has been initially corrugated and then partially flattened to form a series of partially overlapped and partially coextensive folds or plaits, with one surface of the sheet of fin stock material being covered with the aforementioned weld preventing or stop weld material. The layer of fin stock is superposed on one side of the composite and the entire assemblage or blank is then forge welded as by hot rolling to form an integrated unitary structure with the composite sheets being welded to one another except in the areas of the pattern of stop weld material, and with the layer of fin stock material being integrally joined to the surface of the composite except where the folds or plaits overlap one another. The now embryonic heat exchange device is expanded by injecting fluid under pressure into the unjoined areas between the sheets of the composite to inflate and expand these areas thereby forming internal hollow passageways suitable for passage therethrough of a fluid heat transfer medium.

Subsequently thereto the unjoined juxtaposed adjacent folds or plaits which are not joined to the composite are lifted in a variety of ways more fully described below to form erect or outstanding fins which assume a position substantially perpendicular to the plane of the panel and which are integrally unified therewith.

Having thus described in general terms a preferred manner of the practice of this invention, it becomes a principal object thereof to provide a method of making a finned heat exchange panel which obviates or eliminates many of the problems associated with prior art manufacture of similar devices.

It is another object of the present invention to provide a method of making a finned heat exchange device which involves the handling or association together of a minimum number of individual components or units and which facilitates the handling of necessary components with greater ease and speed.

Yet another object of the present invention is to provide a method of making a finned heat exchange article in which both the integration of a heat conducting or heat transfer medium panel or core, and the integration of fins to this panel or core are carried out simultaneously.

It is still another object of the present invention to provide a method of making a finned heat exchanger in which a plurality of fins are provided on a heat exchange panel or core by securing thereto a prefolded or preformed sheet of indefinite length.

It is a still further object of the present invention to provide a method of making a finned heat exchange article having integrally unified means for both further increasing heat dissipating surface and conveniently raising all of the fins on a given size panel simultaneously, with the integration of this latter means occuring simultaneously with that of the rest of the device.

It is still another object of the present invention to provide a method of making a finned heat exchange device which facilitates the manufacture of the device on a continuous production basis.

It is still another object of the present invention to provide a method of making a finned heat exchange article which is highly efficient and economical in operation and easy to initiate and maintain.

These and other objects and advantages of the present invention will in part become apparent, and in part be pointed out, in the following detailed description of the invention particularly when considered in conjunction with the accompanying drawings in which.

Figure 1:
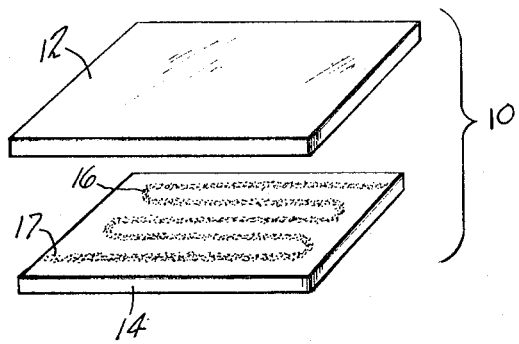
FIGURE 1 is a view in perspective of the components necessary to form one example of a sheet metal composite.

Referring now to the drawings, it will be seen that one manner of practicing the instant invention comprises firstly the formation of a composite sheet metal-stop weld material sandwich 10 such as that illustrated in exploded form in FIGURE 1. More particularly, it is seen that two sheets of metal 12 and 14, such as aluminum, copper, or alloys of these and other metals suitable for pressure welding, are positioned together, with at least one of the sheets having a pattern of stop weld material 16 applied to the confronting face of the sheet. The stop weld material may be applied in any desirable pattern to suit the needs and requirements of the particular application or use intended for the finished article. The pattern will extend to an edge of the sheet composite in at least one location such as 17 to facilitate later fluid pressure inflation. Also, the stop weld material may be applied in any suitable manner well known in the art such as, for example, by squeezing through a silk screen, painting through a stencil, or spraying through a masking die. It should be pointed out that prior to the application of the stop weld material, the sheets 12 and 14 are thoroughly cleaned by degreasing and/or wire brushing, and otherwise prepared for subsequent roll forging operations all in accordance with conventional practice.

Sheets 12 and 14 are positioned adjacent one another with the pattern of stop weld material interposed therebetween. The composite is then secured together in any suitable manner such as by clamping, tack welding, spot welding, etc., to prevent relative slippage between the sheets.

Figure 2:
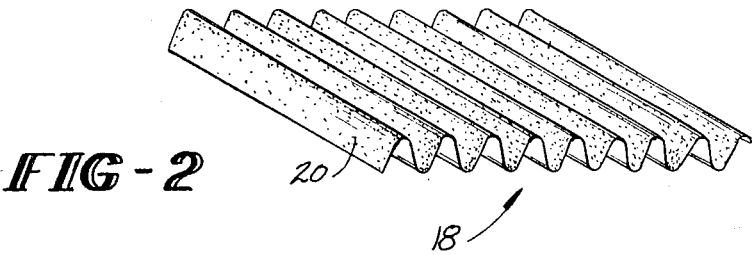
FIGURE 2 is a view in perspective of a given length of fin stock material after having been corrugated or partially folded.

As an independent operation, a relatively thin flat sheet of fin stock material 18 is formed into the corrugated configuration illustrated in FIGURE 2. The fin stock material may be formed of the same metal or alloy as that of the sheets 12 and 14 of the composite, or of any alloy compatible therewith and suitable for pressure welding operations. An essential characteristic of the fin stock material, however, is that it possess a high degree of thermal conductivity.

The fin stock sheet 18 is corrugated into the configuration shown in FIGURE 2 by any suitable means well known in the art such as by forming dies mounted in a punch press, intermeshing forming gears, or by modification of the principles applicable to heavy paper or cardboard corrugating machines.

Subsequent to corrugating, the sheet 18 is completely covered on one side thereof by a layer 20 of stop weld material which may be done most conveniently by spraying or brushing. However, other methods of application may be employed if for any reason they are found to be more convenient.

Figure 3:
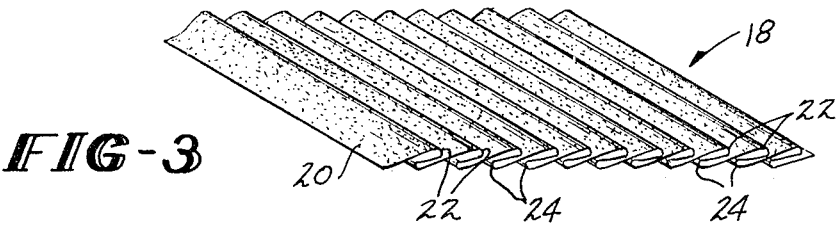
FIGURE 3 is a view similar to FIGURE 2 showing the fin stock material in preformed condition.
Figure 3A:
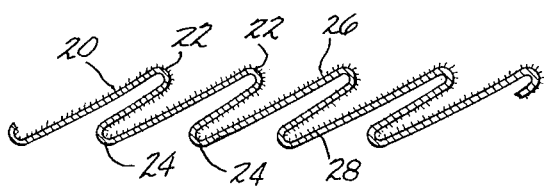
FIGURE 3A is a fragmentary side view of FIGURE 3 on a larger scale illustrating the location of stop weld material and the plait overlap.

Subsequent to the application of the layer 20 of stop weld material, the sheet 18 of fin stock material is subjected to a flattening or compacting operation by which sheet 18 is pressed into the configuration substantially as shown in FIGURES 3 and 3A. It will be observed that in this compacted configuration, the formerly corrugated sheet now consists of a plurality of oppositely facing folds or plaits, that is, alternately adjacent plaits 22 extending upwardly and alternately adjacent plaits 24 extending downwardly, with any given pair of directly connected plaits 22 and 24 being termed immediately adjacent plaits. It will also be apparent from FIGURES 3 and 3A that the compacted sheet of fin stock material constitutes a layer consisting of a plurality of plaits 22 and 24 which are overlapped one upon another, with oppositely facing end portions 26 and 28 of plaits 22 and 24 respectively extending beyond the ends of the next alternately adjacent plaits 22 and 24, as seen in greater detail in FIGURE 3A. This compacted configuration can be obtained in any suitable manner such as by means of a roller leveler having a plurality of sets of spaced apart rollers being in continuously decreasing spatial relationship.

Figure 4:
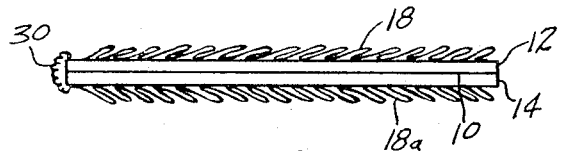
FIGURE 4 is a side view of the assemblage or blank of fin stock material superposed on the composite.

Referring now to FIGURE 4, it will be observed that the compacted fin stock material 18 is superposed on the composite 10, with the uncoated alternately adjacent end portions 28 of the layer of fin stock material being in contact with the surface of sheet 12 or 14 of the composite. As seen in FIGURE 4, corresponding layers 18 and 18A of fin stock material are disposed on opposite sides of the composite 10 so that in the finished article, heat dissipating fins will be secured to both surfaces of the heat exchange panel. The principles of this invention are equally applicable to the disposition of fin stock material on one or both surfaces of the composite 10 thereby resulting in either a single or double surface finned heat exchanger.

Figure 5:
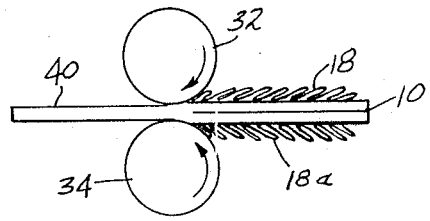
FIGURE 5 is a side view of the hot rolling operation.

After the layer of fin stock material is positioned on the composite, the assemblage or heat exchanger blank is secured together by means of spot or tack welding 30 to prevent relative movement between the various components. The blank is then heated to the required temperature conventional for pressure welding and appropriate for the particular alloy being utilized, after which the blank is formed into an integral unitary structure such as by pressure rolling as illustrated in FIGURE 5 by being placed between pressure rolls 32 and 34, which weld the several components together except in the areas covered by stop weld material. More specifically, the sheets 12 and 14 forming the composite 10 are integrally welded together except in the areas covered by pattern 16 of stop weld material. In addition, the layer 18 of fin stock material is integrally welded to the surface of composite 10 along the exposed end portions 28 of plaits 24, and in addition, adjacent or overlapping connecting portions of plaits 22 and 24 which are not coated with stop weld material are integrally welded to each other.

Subsequent to the rolling and welding operation, the unified panel may be annealed or otherwise heat treated to develop desirable metallurgical characteristics. The unified panel is then inflated by conventional practice, which generally comprises inserting a nozzle or injection needle into that portion of the stop weld pattern indicated 17 in FIGURE 1 which extends to the edge of the sheet or composite. A fluid under appropriate pressure is injected through the nozzle to inflate the sheets 12 and 14 in the areas where they are not joined together as a result of the pattern of stop weld material 16, thereby forming a plurality of internal passageways corresponding in configuration to the pattern 16 of stop weld material.

Figure 6:
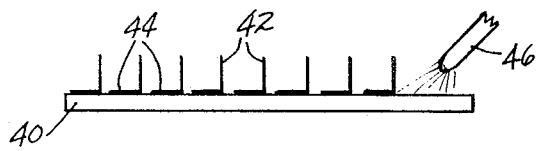
FIGURE 6 is a side view of one manner of raising the integrated fins.

As shown in FIGURE 6 the unified fins, which lie flat subsequent to the pressure rolling and inflating operations, may be raised to an erect or vertical position by means of an air blast directed against the fins from a suitable nozzle or nozzles 46. This results in a structure in which the unified composite 40 has attached thereto individual fins 42 which are of double thickness relative to the original fin stock material, and are connected to the panel 40 along portions 44 which formerly constituted the uncoated extending end portions 28 of plaits 24.

As an alternative method of raising the fins, the stop weld material is first removed from the exposed end portions 26 of plaits 22 which extend beyond alternate adjacent plaits 22, after which a suitable piece of heavy cardboard or other relatively stiff material is adhesively bonded to the exposed end portions 26. This bonded sheet or cover plate is then raised by any suitable means such as by forcing a fluid pressure between the cover plate and the unified composite, or by gripping the cover plate from the outside thereof and raising it, such as by means of suction, mechanical gripping means, or the application of a magnetic force if the cover plate is made of a suitable metal.

Figure 7:
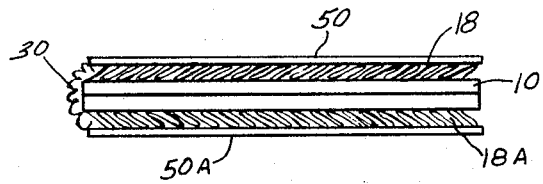
FIGURE 7 is a view similar to FIGURE 4 illustrating another example of heat exchange article obtained by a modified practice of this invention.
Figure 8:
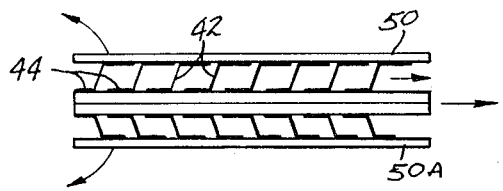
FIGURE 8 is a view similar to FIGURE 6 illustrating the modified manner of raising the fins employed with the article of FIGURE 7.
Figure 9:
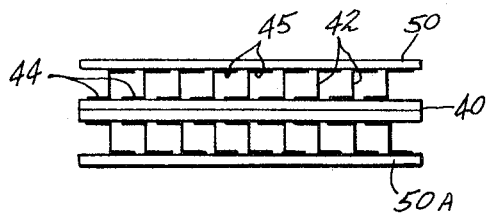
FIGURE 9 is a side view of the modified article illustrating the fins in their fully erect position.

An alternative manner of practicing the method of this invention, which not only facilitates raising the fins as just described, but which also provides additional heat dissipating surface, and presents a compact storage unit, is illustrated in FIGURES 7 through 9. In this modified method, the composite 10 and sheets 18 and 18A are prepared and assembled together in th same manner as described above. It should be noted that only the sheet 18 or 18A need be utilized if fins are desired on but one side of the finished panel. For purposes of illustration, however, the discussion of this method of the invention will be confined to opposite layers of fin stock material.

Thereafter, the layer 20 of stop weld material is removed from the exposed end portions 26 of plaits 22, and additional sheets 50 and 50A are positioned over the layers 18 and 18A of fin stock material, after which the entire assemblage is suitably secured together.

This assemblage is heated and pressure rolled as described above to well all of the components together except in the areas coated with suitable weld material. More specifically, the sheets 12 and 14 of composite 10, and the layers 18 and 18A are integrally bonded together as described above. The cover sheets 50 and 50A are integrally bonded to the layers 18 and 18A of fin stock material in the areas formerly defined by exposed end portions 26 of plaits 22.

The unified blank is then inflated by conventional practice substantially as described above. This results in a finned panel with integral internal tubes which can be shipped, stacked and worked with the fins in a collapsed condition. The fins would be lifted prior to assembly in its intended application.

FIGURE 8 illustrates the manner by which the fins are lifted at any time that may be desirable, either during the fabrication process or at a time subsequent to shipment to the site of application. Since the cover sheets 50 and 50A are respectively bonded to the exposed end portions of the uncoated plaits of layers 18 and 18A of fin stock material, oppositely directed outward movement of the cover sheets 50 and 50A will effect raising movement of the fins as illustrated in FIGURE 8. In other words, the fins of layers 18 and 18A are raised by moving cover sheet 50 upwardly and to the left and cover sheet 50A downwardly and to the left, while maintaining the panel 40 stationary or moving it to the right. These cover sheets 50 and 50A are raised in any of a variety of convenient ways as indicated above, that is, by suitable mechanical means, suction gripping devices, magnetic attraction, or by interposing fluid pressure between the cover sheets and an adjacent panel surface.

Movement of the cover sheets with corresponding raising of the fins is continued until the fins are substantially in perpendicular relationship to the panel 40 as illustrated in FIGURE 9. It is readily seen that this manner of practicing the invention results in a finned heat exchanger having integrally unified spaced cover sheets 50 and 50A secured to the fins 42 in the same manner at 45 as that by which the fins are secured to the panel at 44.

Figure 10:
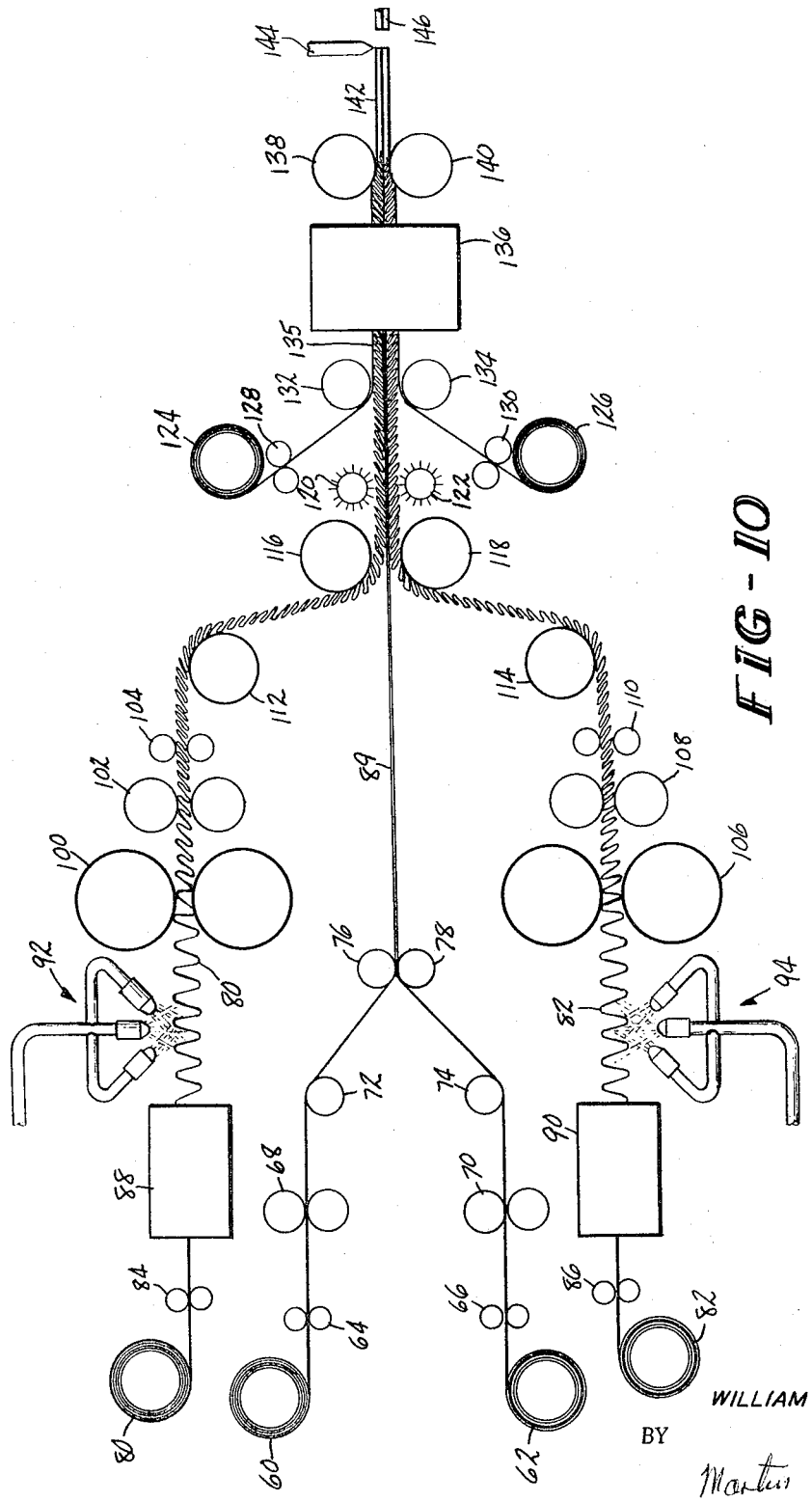
FIGURE 10 is a partially schematic and partially diagrammatic illustration of an illustrative operation for practicing the present invention on a continuous production basis.

It will become apparent from a consideration of FIGURE 10 that the several embodiments of the practice of this invention may be carried out on a continuous production line basis in which each of the several components of the finished product is fabricated in strips of indefinite length and is fed and assembled continuously to form a partially finished product of indefinite length which is then severed to facilitate completion of the processing.

More particularly, it will be observed in FIGURE 10 that there is provided suitable supply rolls of composite sheet stock 60 and 62 which are unrolled respectively by pairs of suitable feed rolls 64 and 66, and fed between suitable pairs of printing rolls 68 and 70 which apply a series of predetermined patterns of stop weld material to one or both of the confronting faces of sheet stock 60 or 62. For purposes of ease of inflation, these series of patterns may be connected so that they can be inflated serially.

The sheet stock 60 and 62 is passed over suitable guide rolls 72 and 74 respectively so as to be joined together in face to face relationship between pressure rolls 76 and 78 to form an endless strip of composite 89.

Suitably positioned in relation to the supplies of composite sheet stock material 60 and 62 is either one or two supply rolls 80 and 82 of fin stock material. The strip of fin stock material is fed by suitable pairs of feed rolls 84 and 86 into appropriate corrugating apparatus 88 and 90 such as described above in which the fin stock is corrugated into the configuration illustrated in FIGURE 2. Subsequently, the outwardly facing surface of the corrugated fin stock material is covered with a layer or coating of stop weld material such as by the spraying apparatus 92 and 94 or other suitable means, after which the fin stock material passes through a flattening or compacting apparatus as indicated by the pairs of flattening rolls 100, 102 and 104, and 106, 108 and 110 for strips 80 and 82 respectively. The now compacted or flattened fin stock material is passed over suitable guide rolls 112 and 114 to be associated with the sheet stock material composite 89 between a pair of pressure rolls 116 and 118.

If it is desired to provide the outer cover sheets 50 and 50A as shown in FIGURES 7–9 as a pair of metal sheets bonded to the outer ends of the fins, it becomes necessary to remove the stop weld material from the exposed end portions of outwardly facing plaits of folded fin stock sheets 80 and 82. This may be accomplished by any suitable means, and is illustrated in FIGURE 10 as a pair of rotating wire brushes 120 and 122 which engage the folded fin stock material with sufficient pressure to remove substantially all of the stop weld material from the exposed plait surface.

Suitably positioned adjacent the opposite sides of the fin stock layers is a pair of supply rolls of cover sheet stock 124 and 126 which are fed by means of pairs of feed rolls 128 and 130 respectively to a pair of pressure rolls 132 and 134 which associate the sheets 124 and 126 with the outer surfaces of the folded fin stock 80 and 82. The panel blank 135 is now complete and ready for the welding operation.

From pressure rolls 132 and 134 the blank is fed by appropriate means into a furnace 136 of suitable construction to raise the temperature of the panel blank continuously passing therethrough to a level necessary for pressure welding. Upon emerging from the furnace or other suitable heating apparatus, the blank is passed between pressure rolls 138 and 140 which reduce the thickness of the entire blank and firmly weld all parts thereof together except in the areas still covered with stop weld material, all in accordance with conventional practice.

As the now unified blank 142 emerges from the roll forging apparatus as indicated by rolls 138 and 140, which apparatus, it is to be understood, performs all standard operations incident to roll forging including both hot and cold rolling reductions with interannealing if necessary, the blank 142 may be subjected to further heat treating if desired to develop certain metallurgical characteristics, or it may be passed directly to a suitable shearing or cutting apparatus indicated illustratively as 144. This apparatus severs the continuous blank 142 into sections or pieces 146 of a length convenient for handling. It is to be understood that the pieces 146 may be cut only as long as a single pattern of stop weld material applied by printing rolls 68 and 70; or the pieces 146 may be cut so as to encompass a plurality of such patterns with an interconnecting passageway which permits subsequent inflation of these patterns simultaneously. In either event, the individual unified blanks are thereafter processed in either of the manners described above with respect to the order of inflating the unjoined portions of the composite sheets 60 and 62 to form the interior hollow passageways, and raising the fins to form the final heat exchange device.

As an alternative in the continuous production operation, the unified blank 142 may be passed directly from the roll forging apparatus to a suitable inflation press (not shown) where the unjoined portions of composite sheets 60 and 62 are inflated to form the interior hollow passageways before the unified blank is severed into individual panels. This procedure has the advantage of permitting inflation of an infinite number of passageway patterns on a continuous production basis. After inflation, the blank is passed through a suitable severing apparatus 144 to be cut into individual panels 146.

It will be apparent from the foregoing description and accompanying drawings that there has been provided a method for making a finned heat exchange or transfer device which provides solutions to the foregoing problems and achieves the aforementioned objects. It is to be understood that the invention is not limited to the illustrations described and shown herein which are deemed to be merely illustrative of the best modes of carrying out the invention, and which are susceptible of modification, but rather is intended to encompass all such modifications which are within the spirit and scope of the invention as set forth in the appended claims.

What I claim and desire to secure by Letters Patent is:

1. The method of making a finned sheet metal article comprising the steps of
    (A) forming a plaited fin stock layer by providing a corrugated metal sheet, coating one side of said corrugated sheet with weld preventing material, forming said coated sheet into a substantially flat layer of a plurality of partially overlapped plaits with oppositely facing end portions of immediately adjacent plaits extending beyond the ends of alternate adjacent plaits respectively, and removing the coating from the exposed end portion of said plaits of said layer,
    (B) forming a blank by disposing said layer of plaited fin stock intermediate a pair of metal sheets with the uncoated end portions of oppositely facing alternate adjacent plaits being in contact with said other sheets,
    (C) forming an integrated unitary structure by pressure welding said plaited fin stock layer to said other sheets in the area of said uncoated end portions, and
    (D) effecting relative outward and lateral movement between said other sheets thereby raising the unjoined alternate adjacent plaits of said plaited fin stock layer to provide integral erect fins secured to said other sheets in the area of said uncoated end portions.

2. The method of making a finned sheet metal article comprising the steps of
    (A) forming a pair of plaited fin stock layers by providing a pair of corrugated metal sheets, coating one side of each of said corrugated sheets with weld preventing material, forming each of said corrugated sheets into substantially flat layers of a plurality of partially overlapped plaits with oppositely facing end portions of immediately adjacent plaits extending beyond the ends of alternate adjacent plaits respectively, and removing the coating from the exposed end portion of said plaits of each of said layers,
    (B) disposing said layers of plaited fin stock on opposite sides of a metal sheet with the uncoated end portions of alternate adjacent plaits of each of said layers being in contact with said sheet,
    (C) forming a blank by superposing another metal sheet on each of said layers of plaited fin stock in contact with the uncoated end portions of alternate adjacent plaits opposite said first mentioned end portions,
    (D) forming an integrated unitary structure by pressure welding said layers of plaited fin stock to said first mentioned sheet and to said other metal sheets in the areas of said uncoated end portions, and
    (E) moving said other sheets outwardly away from, and laterally relative to, said first mentioned sheet whereby the unjoined alternate adjacent plaits of said fin stock layers are raised to an erect disposition on said opposite sides of said first sheet and said other sheets are disposed in spaced relationship to said first sheet.

3. The method of making a finned heat exchanger comprising the steps of
    (A) forming a composite of a pair of superposed metal sheets, one of said having applied to a confronting face thereof a pattern of weld preventing material,
    (B) forming a plaited fin stock layer by providing a corrugated metal sheet, coating one side of said corrugated sheet with weld preventing material, forming said coated sheet into a substantially flat layer of a plurality of partially overlapped plaits with oppositely facing end portions of immediately adjacent plaits extending beyond the ends of alternate adjacent plaits respectively, and removing the coating from the exposed end portion of said plaits of said layer,
    (C) superposing said plaited fin stock layer on said composite with one set of end portions being in contact with said composite,
    (D) forming a blank by superposing another sheet of metal on said plaited fin stock layer and in contact with the other set of end portions of said layer,
    (E) forming an integrated unitary structure by pressure welding said sheets of said composite together except in the area of said pattern of weld preventing material and simultaneously pressure welding said plaited fin stock layer to said composite and said other sheet to said plaited fin stock layer in the areas of said sets of end portions,
    (F) inflating the unjoined portions of said composite by injecting thereinto a fluid under pressure thereby forming interior hollow passageways, and
    (G) raising the unjoined alternate adjacent plaits of said plaited fin stock layer thereby providing integral erect fins overlying said hollow passageways and disposing said other sheet in parallel spaced relationship with said composite.

4. The method of making a finned heat exchanger comprising steps of
    (A) forming a composite of a pair of superposed metal sheets, one of said sheets having applied to a confronting face thereof a pattern of weld preventing material,
    (B) forming a pair of plaited fin stock layers by providing a pair of corrugated metal sheets, coating one side of each of said corrugated sheets with weld preventing material, forming each of said corrugated sheets into substantially flat layers of a plurality of partially overlapped plaits with oppositely facing end portions of immediately adjacent plaits extending beyond the ends of alternate adjacent plaits respectively, and removing the coating from the exposed end portion of said plaits of each of said layers, (C) superposing said plaited fin stock layers on opposite sides of said composite with one set of end portions being in contact with said composite, (D) forming a blank by superposing another sheet of metal on each of said plaited fin stock layers and in contact with the other set of end portions of said layers, (E) forming an integrated unitary structure by pressure welding said sheets of said composite together except in the area of said pattern of weld preventing material and simultaneously pressure welding said plaited fin stock layers to said composite and said other sheets to said plaited fin stock layers in the areas of said sets of end portions, (F) inflating the unjoined portions of said composite by injecting thereinto a fluid under pressure thereby forming interior hollow passageways, and (G) raising the unjoined alternate adjacent plaits of said plaited fin stock layers thereby providing integral erect fins disposed on opposite sides of said composite and overlying said hollow passageways and disposing said other sheets in parallel spaced relationship with said composite.

5. The method of making a finned heat exchanger comprising the steps of (A) forming a composite of a pair of superposed metal sheets, one of said sheets having applied to a confronting face thereof a pattern of weld preventing material, (B) forming a plaited fin stock layer by providing a corrugated metal sheet, coating one side of said corrugated sheet with weld preventing material, forming said coated sheet into a substantially flat layer of a plurality of partially overlapped plaits with oppositely facing end portions of immediately adjacent plaits extending beyond the ends of alternate adjacent plaits respectively, and removing the coating from the exposed end portion of said plaits of said layer, (C) superposing said plaited fin stock layer on said composite with one set of end portions being in contact with said composite, (D) forming a blank by superposing another sheet of metal on said plaited fin stock layer and in contact with the other set of end portions of said plaited fin stock layer, (E) forming an integrated unitary structure by pressure welding said sheets of said composite together except in the area of said pattern of weld preventing material and simultaneously pressure welding said plaited fin stock layer to said composite and said other sheet to said plaited fin stock layer in the areas of said sets of end portions, (F) raising the unjoined alternate adjacent plaits of said plaited fin stock layer thereby providing integral erect fins overlying said pattern of weld preventing material and disposing said other sheet in parallel spaced relationship with said composite, and (G) inflating the unjoined portions of said composite by injecting thereinto a fluid under pressure thereby forming interior hollow passageways within said composite.

6. The method as set forth in claim 5 wherein said raising of said unjoined alternate adjacent plaits of said plaited fin stock layer is accomplished by effecting relative outward and lateral movement between said composite and said other sheet.

7. The method of making a finned heat exchanger comprising the steps of (A) forming a composite of a pair of superposed metal sheets, one of said sheets having applied to a confronting face thereof a pattern of weld preventing material, (B) forming a pair of plaited fin stock layers by providing a pair of corrugated metal sheets, coating one side of each of said corrugated sheets with weld preventing material, forming each of said corrugated sheets into substantially flat layers of a plurality of partially overlapped plaits with oppositely facing end portions of immediately adjacent plaits extending beyond the ends of alternate adjacent plaits, respectively, and removing the coating from the exposed end portion of said plaits of each of said layers, (C) superposing said plaited fin stock layers on opposite sides of said composite with one set of end portions being in contact with said composite, (D) forming a blank by superposing another sheet of metal on each of said plaited fin stock layers and in contact with the other set of end portions of said layers, (E) forming an integrated unitary structure by pressure welding said sheets of said composite together except in the area of said pattern of weld preventing material and simultaneously pressure welding said plaited fin stock layers to said composite and said other sheets to said plaited fin stock layers in the areas of said sets of end portions, (F) inflating the unjoined portions of said composite by injecting thereinto a fluid under pressure thereby forming interior hollow passageways, and (G) moving said other sheets outwardly away from, and laterally relative to, said composite whereby the unjoined alternate plaits of said fin stock layers are raised to an erect disposition on said opposite sides of said composite and said other sheets are disposed in spaced relationship to said composite.

8. The method of continuously making a plurality of finned heat exchanger devices comprising the steps of (A) providing a plurality of juxtaposed continuously moving strips of composite sheet stock of indefinite length and at least one continuously moving strip of fin stock of indefinite length in juxtaposition to one of said strips of composite sheet stock, (B) continuously applying a pattern of weld preventing material to a confronting face of at least one of said strips of composite sheet stock, and continuously corrugated said fin stock, (C) continuously applying a coating of weld preventing material to the face of said strip of fin stock remote from said strip of composite sheet stock, (D) forming said coated strip of corrugated fin stock into a substantially flat layer of a plurality of partially overlapped plaits with oppositely facing end portions of immediately adjacent plaits extending beyond the ends of alternate adjacent plaits respectively, (E) associating said strips of composite sheet stock together to form a composite strip and substantially simultaneously therewith superposing said layer of plaited fin stock on one side of said composite strip, (F) removing said weld preventing material from the exposed end portions of alternate adjacent plaits remote from said composite strip, (G) continuously disposing another layer of metal strip on said layer of plaited fin stock on the side thereof remote from said composite strip to form a panel blank, (H) forming an integrated unitary blank of indefinite length by pressure welding said sheets of said composite together except in the area of said pattern of weld preventing material and simultaneously pressure welding said plaited fin stock layer to said composite strip and said other sheet to said plaited fin stock layer in the areas of said end portions, (I) inflating said unified blank in the unjoined portions of said composite by injecting thereinto a fluid under pressure thereby forming interior hollow passageways, (J) severing said unified blank into sections of finite length, and (K) raising the unjoined alternate adjacent plaits of said plaited fin stock layer thereby providing integral erect fins overlying said hollow passageways and disposing said other sheet in parallel spaced relationship with said composite.

References Cited by the Examiner

UNITED STATES PATENTS

| | | | |
|---|---|---|---|
| 2,711,382 | 6/1955 | Smith-Johannsen | 19—157.3 X |
| 3,067,492 | 12/1962 | Johnson | 29—157.3 |
| 3,111,747 | 11/1963 | Johnson | 29—157.3 |
| 3,164,894 | 1/1965 | Johnson et al. | 29—157.3 X |
| 3,206,839 | 9/1965 | Tranel et al. | 29—157.3 |
| 3,239,922 | 3/1966 | Hansson | 29—157.3 |
| 3,247,583 | 4/1966 | Hansson et al. | 29—157.3 |

JOHN F. CAMPBELL, *Primary Examiner.*

J. D. HOBART, *Assistant Examiner.*